(12) United States Patent
Ugur et al.

(10) Patent No.: US 9,307,122 B2
(45) Date of Patent: Apr. 5, 2016

(54) METHOD, APPARATUS, AND COMPUTER PROGRAM PRODUCT FOR PROVIDING MOTION ESTIMATION FOR VIDEO ENCODING

(75) Inventors: Kemal Ugur, Tampere (FI); Jani Lainema, Tampere (FI); Antti Hallapuro, Tampere (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 2372 days.

(21) Appl. No.: 11/535,647

(22) Filed: Sep. 27, 2006

(65) Prior Publication Data

US 2008/0075169 A1  Mar. 27, 2008

(51) Int. Cl.
| | |
|---|---|
| H04N 11/02 | (2006.01) |
| H04N 5/14 | (2006.01) |
| G06T 7/20 | (2006.01) |
| H04N 19/53 | (2014.01) |
| H04N 19/533 | (2014.01) |
| H04N 19/523 | (2014.01) |

(52) U.S. Cl.
CPC .............. H04N 5/145 (2013.01); G06T 7/2026 (2013.01); H04N 19/523 (2014.11); H04N 19/53 (2014.11); H04N 19/533 (2014.11)

(58) Field of Classification Search
USPC .................................................... 375/240.16
See application file for complete search history.

(56) References Cited

U.S. PATENT DOCUMENTS

| | | | | |
|---|---|---|---|---|
| 6,735,249 | B1 * | 5/2004 | Karczewicz et al. | 375/240 |
| 6,738,494 | B1 * | 5/2004 | Savakis et al. | 382/100 |
| 7,020,201 | B2 * | 3/2006 | Luo et al. | 375/240.16 |
| 8,102,916 | B1 * | 1/2012 | Masterson et al. | 375/240.16 |
| 2001/0046264 | A1 * | 11/2001 | Fandrianto et al. | 375/240.16 |
| 2004/0252766 | A1 * | 12/2004 | Lee et al. | 375/240.17 |

OTHER PUBLICATIONS

Wong et al.; Fast Sub-Pixel Inter-Prediction—Based on Texture Direction Analysis; (FSIP-BTDA); Circuits and Systems IEEE International Symposium, May 23-26, 2005; pp. 5477-5480; vol. 6, No. pp.
Wong et al.; Sub-Optimal Quarter-Pixel Inter-Prediction Algorithm (SQIA);Acoustics, Speech, and Signal Processing Proceedings IEEE International Conference; Mar. 18-23, 2005; pp. ii/921-ii/924; vol. 2, No. pp.
Cheng-Du et al.; PPHPS: A Parabolic Prediction-Based, Fast Half-Pixel Search Algorithm for Very Low Bit-Rate Moving-Picture Code; Circuits and Systems for Video Technology, IEEE Transactions; Jun. 2003; pp. 514-518; vol. 13, No. 6.

* cited by examiner

*Primary Examiner* — Dave Czekaj
*Assistant Examiner* — Leron Beck
(74) *Attorney, Agent, or Firm* — Po-Wei Chen

(57) ABSTRACT

An apparatus for providing motion estimation for video encoding includes a selection element and a processing element. The selection element is configured to select a subset including less than all of candidate pixel locations from among a plurality of candidate pixel locations used for motion vector determination based on a relationship between a best candidate pixel location of a first level of accuracy and a best candidate pixel location of a second level of accuracy. The processing element is configured to process an input video sequence to determine a motion vector at the first level of accuracy, to refine the motion vector at the second level of accuracy, and to determine the motion vector at a third level of accuracy using only the subset of candidate pixel locations.

22 Claims, 9 Drawing Sheets

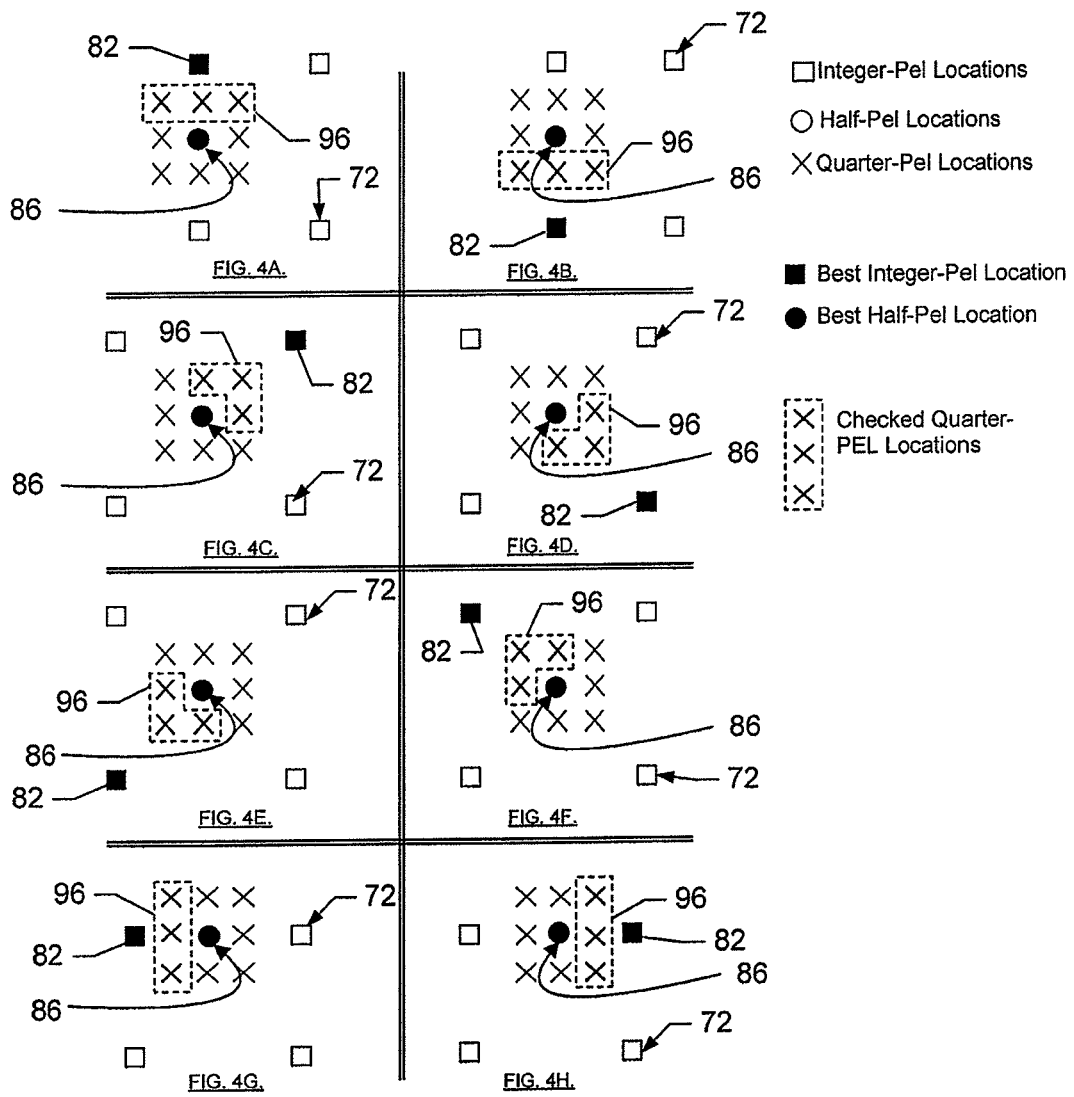

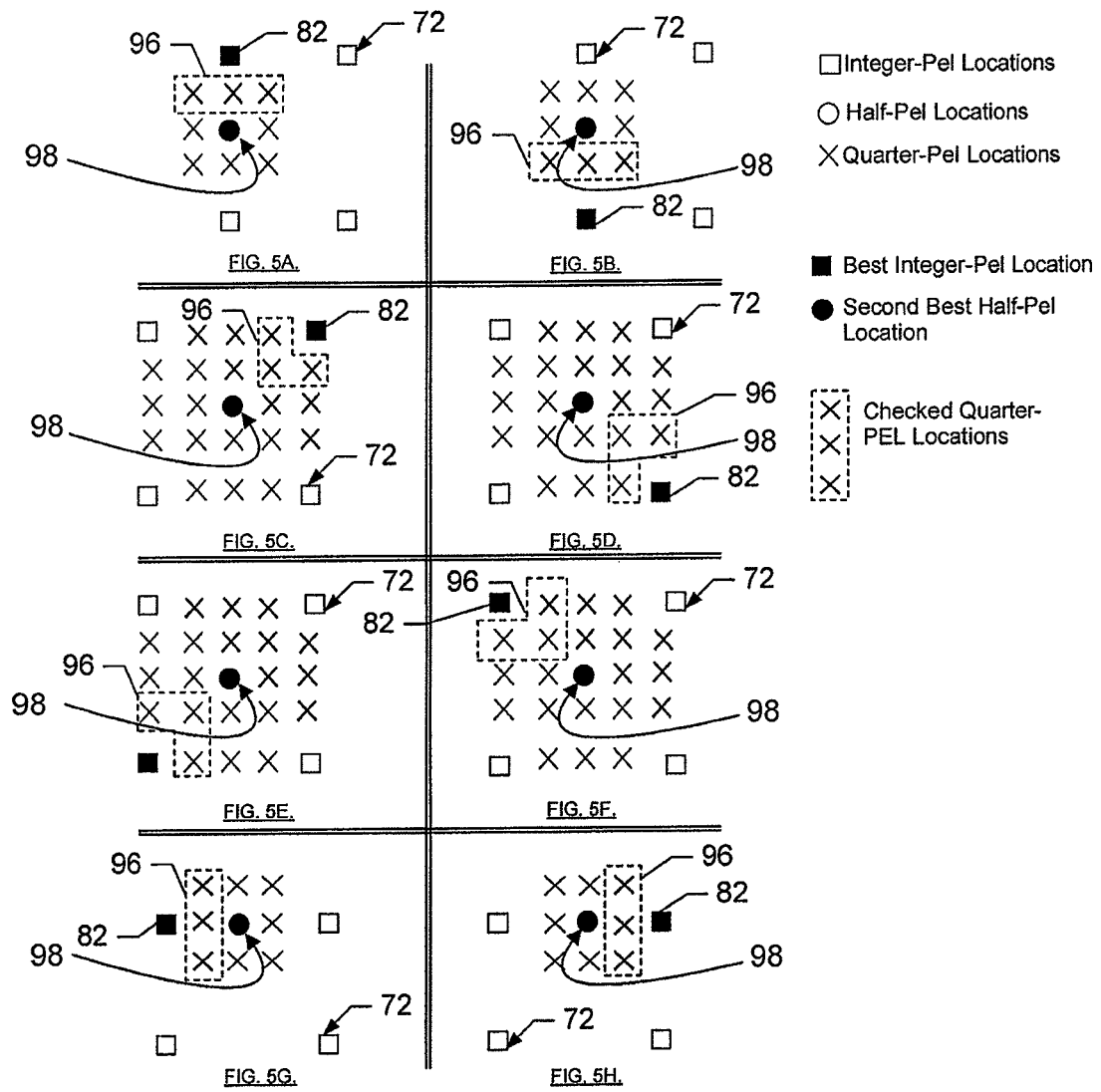

Reference 4x4 block for Motion Vector (1.25,0.75) (horizontal 1.25 vertical 0.75)

Current Frame (shaded block is a 4x4 block that ME is trying to find the best match)

METHOD, APPARATUS, AND COMPUTER PROGRAM PRODUCT FOR PROVIDING MOTION ESTIMATION FOR VIDEO ENCODING

TECHNOLOGICAL FIELD

Embodiments of the present invention relate generally to signal processing and video coding technology and, more particularly, relate to a method, apparatus and computer program product for providing fast motion estimation in a video coding system.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase the ease of information transfer and convenience to users relates to provision of various applications or software to users of electronic devices such as mobile terminals. The applications or software may be executed from a local computer, a network server or other network device, or from the mobile terminal such as, for example, a mobile telephone, a mobile television, a mobile gaming system, video recorders, cameras, etc, or even from a combination of the mobile terminal and the network device. In this regard, various applications and software have been developed, and continue to be developed, in order to give the users robust capabilities to perform tasks, communicate, entertain themselves, gather and/or analyze information, etc. in either fixed or mobile environments.

Given the ubiquitous nature of cameras in mobile terminals and other resource constrained devices, efforts have been made to improve image quality and other image processing techniques. For example, certain applications have been developed to improve image processing by introducing motion vectors, which are now well known in the art. Motion vectors are used in motion estimation for motion compensated prediction in order to increase coding efficiency. Motion vectors describe the relative motion of a particular block in subsequent frames by representing the motion of the particular block in a frame to the position of a best match for the particular block in a subsequent frame. By employing motion vectors in describing the motion of blocks in subsequent frames with increased accuracy, state-of-the-art video coding standards may provide improved video quality at similar bit rates to the bit rates of previous standards. Accordingly, motion vectors are typically utilized in a motion estimation stage during which interpolation steps are performed to estimate the motion vectors. Furthermore, such motion vectors may be produced with accuracies beyond the integer pixel level to the half or even quarter pixel levels. Future technologies may even be able to increase accuracies beyond the quarter pixel level. However, motion estimation is often one of the more complex operations of a typical encoder due the interpolation steps performed to determine the motion vectors. Additionally, when increased accuracy is sought, more interpolation steps become advantageous and computational complexity is increased.

Unfortunately, many platforms on which camera images are produced may be limited resource devices such as mobile terminals. Such limited resource devices may have limited computational power, battery life, display sizes, etc. Thus, the increased complexity involved in motion estimation may increase resource consumption and decrease battery life of such devices. Additionally, in real-time encoding use-cases such as video telephony, if the time used for encoding of a particular frame exceeds an allocated time, the frame may be skipped, thereby reducing quality. Accordingly, it may be increasingly desirable to provide algorithms that are capable to achieve faster encoding speeds while maintaining image quality.

BRIEF SUMMARY

A method, apparatus and computer program product are therefore provided for providing a method, apparatus and computer program product for providing improved motion estimation for video encoding.

In one exemplary embodiment, a method of providing improved motion estimation for video encoding is provided. The method includes processing an input video sequence to determine a motion vector at a first level of accuracy, refining the motion vector at a second level of accuracy, selecting a subset including less than all of candidate pixel locations based on a relationship between corresponding best candidate pixel locations of the first and second levels of accuracy, and determining the motion vector at a third level of accuracy using only the subset of candidate pixel locations.

In another exemplary embodiment, a computer program product for providing improved motion estimation for video encoding is provided. The computer program product includes at least one computer-readable storage medium having computer-readable program code portions stored therein. The computer-readable program code portions include first, second, third and fourth executable portions. The first executable portion is for processing an input video sequence to determine a motion vector at a first level of accuracy. The second executable portion is for refining the motion vector at a second level of accuracy. The third executable portion is for selecting a subset including less than all of candidate pixel locations based on a relationship between corresponding best candidate pixel locations of the first and second levels of accuracy. The fourth executable portion is for determining the motion vector at a third level of accuracy using only the subset of candidate pixel locations.

In another exemplary embodiment, an apparatus for providing improved motion estimation for video encoding is provided. The apparatus includes a selection element and a processing element. The selection element is configured to select a subset including less than all of candidate pixel locations from among a plurality of candidate pixel locations used for motion vector determination based on a relationship between a best candidate pixel location of a first level of accuracy and a best candidate pixel location of a second level of accuracy. The processing element is configured to process an input video sequence to determine a motion vector at the first level of accuracy, to refine the motion vector at the second level of accuracy, and to determine the motion vector at a third level of accuracy using only the subset of candidate pixel locations.

In another exemplary embodiment, an apparatus for providing improved motion estimation for video encoding is provided. The apparatus includes means for processing an input video sequence to determine a motion vector at a first level of accuracy, means for refining the motion vector at a second level of accuracy, means for selecting a subset including less than all of candidate pixel locations based on a relationship between corresponding best candidate pixel locations of the first and second levels of accuracy, and means for determining the motion vector at a third level of accuracy using only the subset of candidate pixel locations.

Embodiments of the present invention may be advantageously employed, for example, in resource constrained devices in order to reduce resource consumption by reducing the number of candidate pixel locations for interpolation. Thus, image quality may be substantially maintained, while encoding efficiency is improved.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

FIG. 4 illustrates a schematic diagram of a mechanism for reducing a number of candidate pixel locations to be checked according to an exemplary embodiment of the present invention;

FIG. 5 illustrates a schematic diagram of an alternative mechanism for reducing a number of candidate pixel locations to be checked according to an exemplary embodiment of the present invention;

DETAILED DESCRIPTION

Figure 1:
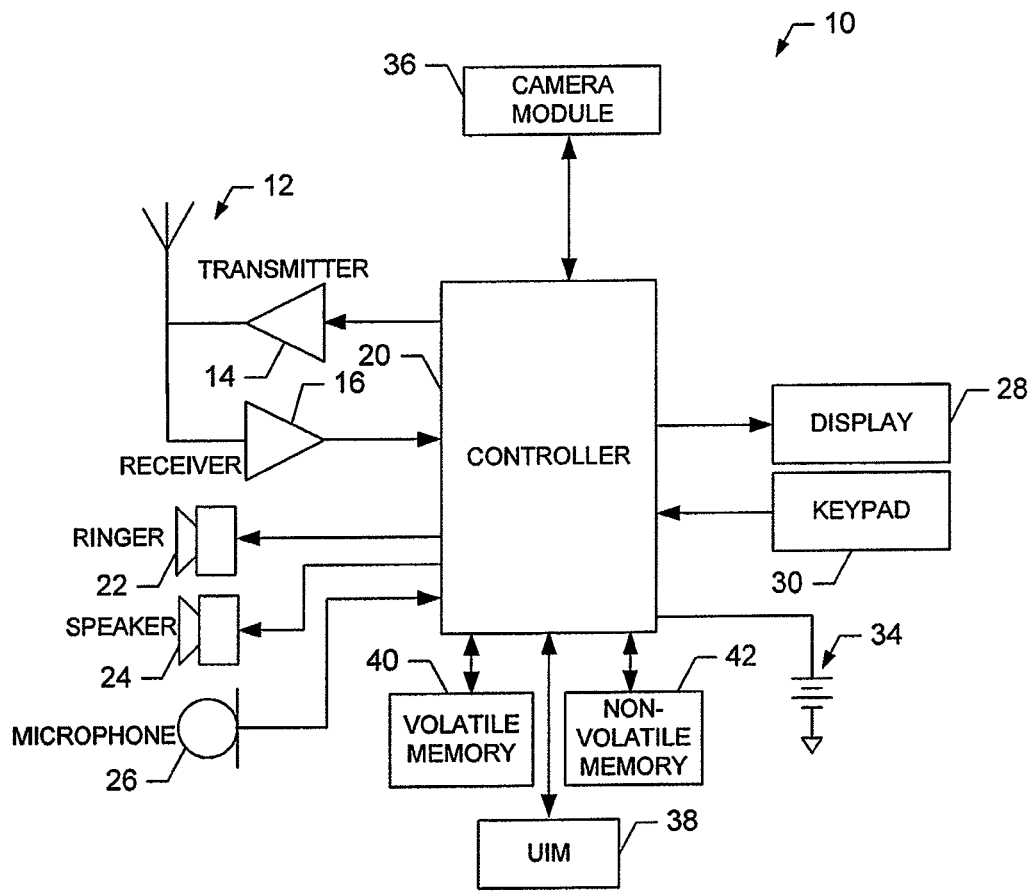
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While several embodiments of the mobile terminal 10 are illustrated and will be hereinafter described for purposes of example, other types of mobile terminals, such as portable digital assistants (PDAs), pagers, mobile televisions, gaming devices, laptop computers, cameras, video recorders, GPS devices and other types of voice and text communications systems, can readily employ embodiments of the present invention. Furthermore, devices that are not mobile may also readily employ embodiments of the present invention.

The system and method of embodiments of the present invention will be primarily described below in conjunction with mobile communications applications. However, it should be understood that the system and method of embodiments of the present invention can be utilized in conjunction with a variety of other applications, both in the mobile communications industries and outside of the mobile communications industries.

The mobile terminal 10 includes an antenna 12 (or multiple antennae) in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA), or with third-generation (3G) wireless communication protocols, such as UMTS, CDMA2000, and TD-SCDMA.

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 also comprises a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

In an exemplary embodiment, the mobile terminal 10 includes a media capturing element, such as a camera, video and/or audio module, in communication with the controller 20. The media capturing element may be any means for capturing an image, video and/or audio for storage, display or transmission. For example, in an exemplary embodiment in which the media capturing element is a camera module 36, the camera module 36 may include a digital camera capable of forming a digital image file from a captured image. As such, the camera module 36 includes all hardware, such as a lens or other optical component(s), and software necessary for creating a digital image file from a captured image. Alternatively, the camera module 36 may include only the hardware needed to view an image, while a memory device of the mobile terminal 10 stores instructions for execution by the controller 20 in the form of software necessary to create a digital image file from a captured image. In an exemplary embodiment, the camera module 36 may further include a processing element such as a co-processor which assists the controller 20 in processing image data and an encoder and/or decoder for compressing and/or decompressing image data. The encoder and/or decoder may encode and/or decode according to a JPEG standard format.

The mobile terminal 10 may further include a universal identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
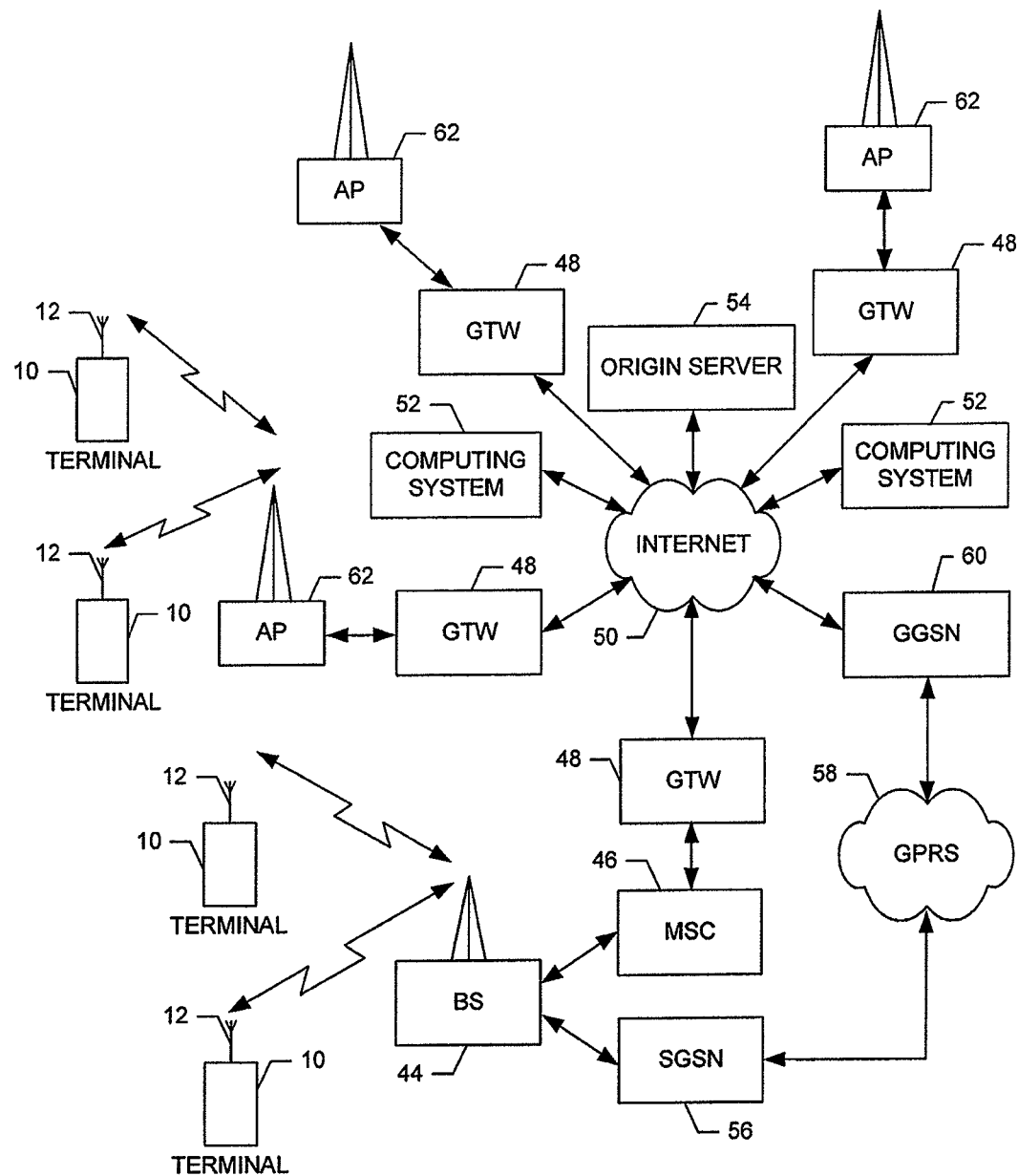
FIG. 2 is a schematic block diagram of a wireless communications system according to an exemplary embodiment of the present invention.

Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a GTW 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G and/or third-generation (3G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

Figure 3A:
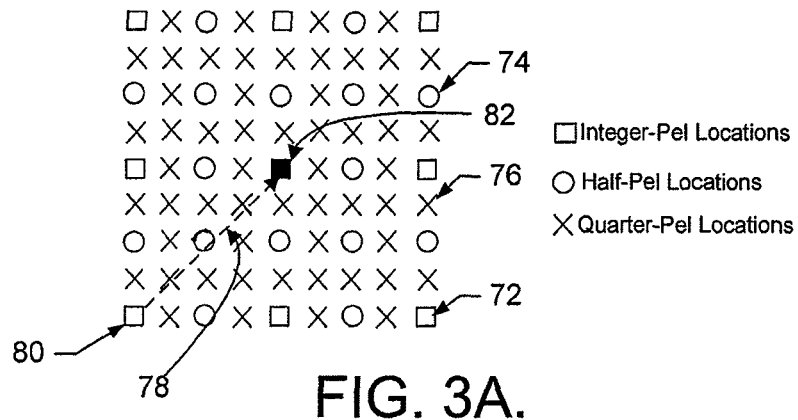
FIG. 3 illustrates a schematic diagram of an exemplary motion vector determination.

As described above, when encoding video data, it is currently possible for motion estimation to be performed in order to increase compression efficiency. For example, the H.264/AVC video coding standard, which provides improved video quality over previous standards with a similar bit rate due to use of motion estimation employing motion vectors, has been increasingly utilized in third generation mobile multimedia services, digital video broadcasting to handheld (DVB-H) and high definition digital versatile discs (HD-DVD). However, since such motion estimation typically involves increased complexity in order to achieve increased accuracy, resource consumption is also increased. In this regard, FIG. 3 shows an example of motion estimation that could be performed. For simplicity, FIG. 3 assumes that an encoder is trying to find the best match of an original pixel in the reference picture. In other words, FIG. 3 shows a motion search for a block of 1 pixel in size for illustration purposes. However, as is well known to those skilled in the art, an encoder would perform motion estimation in a block-by-block basis. As shown in FIG. 3, motion estimation typically includes a series of operations that are performed in order to develop a motion vector (MV) 68 describing the motion from an original pixel location 80 to a reference pixel location 90 using quarter pixel accuracy. However, as shown in FIG. 3, the motion estimation is performed at a series of different accuracy levels such that, initially the encoder finds a best candidate integer pixel location 82 as the pixel that matches best to the reference pixel at the integer pixel level and then proceeds to perform similar searches at the half and quarter pixel levels.

In general, determination of the MV 68 involves finding a reference block (or pixel in this case where the block is 1 pixel in size) that most closely matches the original pixel location 80 in a reference frame and the MV 68 is a vector describing the motion from the original pixel location 80 to the position of the block that most closely matches the original pixel location 80 in the reference frame. In determining which block most closely matches the original block (i.e., block of the original pixel location 80), numerous measures could be employed. For example, a block could be selected as the block that most closely matches the original block in response to minimization of a distortion measure, a sum of absolute difference, or a difference between the block and the original block. It should be noted, however, that any similarity measure or difference measure may be employed to determine the block that most closely matches the original block. Furthermore, in some applications, it may be possible for values of a plurality of candidate blocks that are checked to be known to, stored by, or otherwise accessible to a device practicing the methods disclosed herein for comparison to an original block for determination of which candidate block most closely matches the original block.

In order to increase the accuracy of the MV 68, movement of the original block may be tracked at levels more accurate than simply at the integer pixel level. For example, movement of the original block may be tracked at a half pixel level, a quarter pixel level, or perhaps even a more accurate level than the quarter pixel level. In this regard, integer pixel locations 72 are represented in FIG. 3 and following as a square shape. Every fourth pixel location in vertical, horizontal and diagonal directions may be considered to be an integer pixel location. Half pixel locations 74 are disposed half way between each integer pixel location and are represented as circle shapes in FIG. 3 and following. Accordingly, there are eight half pixel locations 74 which may be considered proximate to any particular integer pixel location. All remaining pixel locations may be considered quarter pixel locations (or quarter pels (QPELs)) 76 and are represented by "X" shapes in FIG. 3 and following.

As described above, in order to accurately determine the MV 68 at the QPEL level of accuracy, a series of operations may be performed in order to find the block that most closely matches the original block with QPEL accuracy. In this regard, a first operation, represented by first component vector 78 shown in FIG. 3A, finds the MV with integer accuracy. For example, the first component vector 78 may describe a vector $MV_X$, $MV_Y$ defining motion from the original pixel location 80 (i.e., the original block) to a block defined at the integer pixel level which provides the closest match to the orignal block. In the first component vector 78, $MV_X$ describes a vertical component of the vector and $MV_Y$ describes a horizontal component of the vector.

When determining the block which provides the closest match to the original block, a value of a candidate block at a particular accuracy level is compared to a corresponding value of the original block to determine a candidate block that most closely matches the original block. Accordingly, the first component vector 78 describes motion of the original block to a location of a best candidate integer pixel location 82 which most closely matches the original block among all candidate integer pixel locations 72. A candidate block at any given accuracy level that most closely matches the original block may be considered a best candidate block at the given accuracy level. Thus, if multiple iterations of calculations are performed in order to improve the level of accuracy of determining the best candidate block, there may be a different candidate block which is considered the best candidate block for each corresponding level of accuracy. As such, a pixel location of a best candidate block at an accuracy level that corresponds to the original pixel location 80 may be considered a best candidate pixel location for the corresponding accuracy level.

Figure 3B:
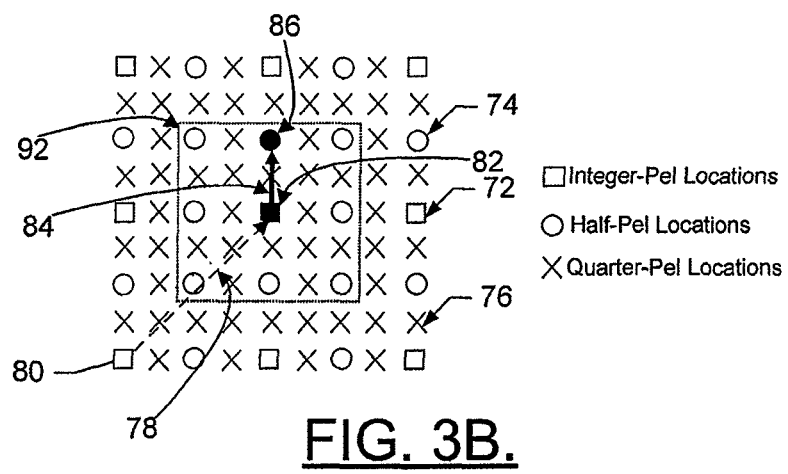

A second operation may be performed, as shown in FIG. 3B, to further refine the result of the first operation. In the second operation, which is represented by second component vector 84, the MV is found with half pixel accuracy. In other words, a best candidate block is found at the half pixel level by performing similarity or difference measures between each candidate block at the half pixel level to find the candidate block that most closely matches the original block with half pixel accuracy. The second component vector 84 may be described by the vector $MV_{H\_X}$, $MV_{H\_Y}$ which describes motion from the best candidate integer pixel location 82 to a best candidate half pixel location 86. As such, a MV drawn from the original pixel location 80 to the best candidate half pixel location 86 would describe a MV at half pixel accuracy.

Figure 3C:
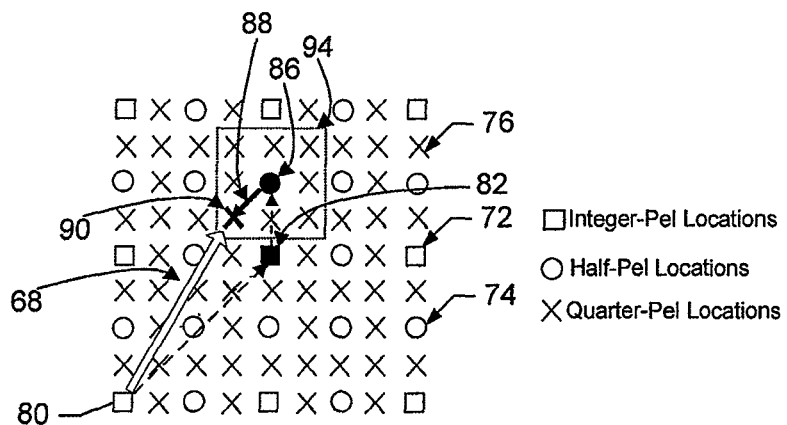

A third operation may be performed as shown in FIG. 3C, to further refine the result of the second operation. In the third operation, which is represented by third component vector 88, the MV 68 is found with quarter pixel accuracy. In other words, a best candidate block is found at the quarter pixel level by performing similarity or difference measures between each candidate block at the quarter pixel level to find the candidate block that most closely matches the original block with quarter pixel accuracy. The third component vector 88 may be described by the vector $MV_{Q\_X}$, $MV_{Q\_Y}$ which describes motion from the best candidate half pixel location 86 to the best candidate quarter pixel location 90. As such, the MV 68 drawn from the original pixel location 80 to the best candidate quarter pixel location 90 describes the MV 68 at quarter pixel accuracy. It may be possible in the future to continue the operations above to yet further levels of accuracy and thus, it should be noted that the principles described herein also apply to the extension of motion estimation to further levels of accuracy.

As indicated above, in order to determine the best candidate pixel location at either the integer, half or quarter pixel levels, interpolation must be performed in order to determine which candidate block defined at a corresponding level most closely matches the original block. Accordingly, in order to complete the first operation described above, a similarity or difference measure must be performed for each candidate integer pixel location in order to determine the best candidate integer pixel location 82. Similarly, in order to complete the second operation described above, a similarity or difference measure must be performed for each candidate half pixel location in order to determine the best candidate half pixel location 86. As such, as shown by the dotted line 92 of FIG. 3B, there are nine candidate half pixels (the integer pixel location is also a half pixel location) for which the similarity or difference measure must be performed in order to determine the best candidate half pixel location 86. Additionally, in order to complete the third operation described above, a similarity or difference measure must be performed for each candidate quarter pixel location in order to determine the best candidate quarter pixel location 90. As such, as shown by the dotted line 94 of FIG. 3C, there are nine candidate quarter pixels (the half pixel location is also a quarter pixel location) for which the similarity or difference measure must be performed in order to determine the best candidate quarter pixel location 90.

However, by examining the nine candidate quarter pixel locations which are proximate to the best candidate half pixel location 86, it can be seen that at least a portion of those candidate quarter pixel locations may be relatively unlikely to be selected as the best candidate quarter pixel location 90 since some of the candidate quarter pixel locations are in fact proximate to a different integer pixel location than the best candidate integer pixel location 82. Thus, if a candidate block based on these candidate quarter pixel locations (i.e., the candidate quarter pixel locations proximate to the different integer pixel location) were to provide the block that provides the closest match to the original block, it may be more likely that the other candidate integer pixel location would have been selected as the best candidate integer pixel location. Accordingly, it may be possible to further simplify the motion estimation process by eliminating a certain number of candidate pixel locations and thereby reducing the amount of calculation required to determine the MV 68. Thus, a reduced number of candidate pixel locations may be selected and only the reduced number of candidate pixel locations may be checked for similarity/difference relative to the original block. In other words, comparison between candidate blocks and the original block may be reduced since such comparisons may only be calculated for selected candidate blocks corresponding to the reduced number of candidate pixel locations. In an exemplary embodiment, the number of candidate pixel locations may be reduced by at least one half, or as shown in FIGS. 4 and 5, by about one third.

In this regard, FIGS. 4 and 5 illustrate schematic diagrams showing examples of a method for selecting a reduced number of candidate pixels to be checked for similarity or difference with respect to the original block in order to determine the MV 68 according to exemplary embodiments of the present invention. It should be noted that although FIGS. 4 and 5 illustrate the operation of the method at the QPEL level, the method could also be performed at other levels as well. Additionally, although FIGS. 4 and 5 each illustrate the selection of three candidate pixels to be checked, it should be understood that any suitable number of candidate pixels could alternatively be selected in embodiments of the present invention so long as such selection results in a decrease in the number of candidate pixels that will be checked as compared to the embodiment described in reference to FIG. 3.

FIG. 4 illustrates the selection of a reduced number of candidate quarter pixel locations to be checked according to exemplary embodiments. In this regard, FIGS. 4A and 4B show selection of the reduced number of candidate pixel locations to be checked for selection of the MV 68 in which the best candidate half pixel location 86 is vertically displaced from the best candidate integer pixel location 82. In other words, the second component vector 84 has only a vertical component and no horizontal component. In FIGS. 4A and 4B, pixel locations selected to be checked (i.e., a subset of candidate pixel locations) are enclosed within dotted line 96. Computations for determining the block that most closely matches the original block may then only be calculated for the pixel locations selected to be checked, thereby reducing computational complexity. As seen in FIGS. 4A and 4B, in an exemplary embodiment, the pixel locations selected to be checked are the candidate pixel locations that are disposed between the best candidate integer pixel location 82 and the best candidate half pixel location 86.

FIGS. 4C, 4D, 4E and 4F show selection of the reduced number of candidate pixel locations to be checked for selection of the MV 68 in which the best candidate half pixel location 86 is diagonally displaced from the best candidate integer pixel location 82. In other words, the second component vector 84 has both a vertical component and a horizontal component. In FIGS. 4C, 4D, 4E and 4F, pixel locations selected to be checked are enclosed within dotted line 96. Computations for determining the block that most closely matches the original block may then only be calculated for the pixel locations selected to be checked, thereby reducing computational complexity. As also seen in FIGS. 4C, 4D, 4E and 4F, in an exemplary embodiment, the pixel locations selected to be checked are the candidate pixel locations that are proximate to the best candidate half pixel location 86 and disposed between the best candidate integer pixel location 82 and the best candidate half pixel location 86.

FIGS. 4G and 4H show selection of the reduced number of candidate pixel locations to be checked for selection of the MV 68 in which the best candidate half pixel location 86 is horizontally displaced from the best candidate integer pixel location 82. In other words, the second component vector 84 has only a horizontal component and no vertical component. In FIGS. 4G and 4H, pixel locations selected to be checked are enclosed within dotted line 96. Computations for determining the block that most closely matches the original block may then only be calculated for the pixel locations selected to be checked, thereby reducing computational complexity as described above. As seen in FIGS. 4G and 4H, in an exemplary embodiment, the pixel locations selected to be checked are the candidate pixel locations that are disposed between the best candidate integer pixel location 82 and the best candidate half pixel location 86.

In summary, for each of the scenarios presented in FIG. 4, the subset of candidate pixel locations that is selected to be checked includes only those pixel locations that are proximate to the best candidate half pixel location 86 and disposed between the best candidate integer pixel location 82 and the best candidate half pixel location 86.

FIG. 5 illustrates the selection of a reduced number of candidate quarter pixel locations to be checked according to exemplary embodiments in which the second component vector 84 is zero. In other words, in a situation in which the best candidate half pixel location 86 is the same as the best candidate integer pixel location 82, the method described above with reference to FIG. 4 may not be preferable. As such, one option would be to perform calculations or check each of the candidate quarter pixel locations that are proximate to the best candidate integer pixel location 82. However, in order to simplify calculations, if a second best candidate half pixel location is known, it may be possible to reduce computational complexity by selecting a reduced number of candidate pixel locations to be checked as set forth below.

In this regard, FIGS. 5A and 5B show selection of the reduced number of candidate pixel locations to be checked for selection of the MV 68 in which the second best candidate half pixel location 98 is vertically displaced from the best candidate integer pixel location 82. In FIGS. 5A and 5B, pixel locations selected to be checked are enclosed within dotted line 96. Computations for determining the block that most closely matches the original block may then only be calculated for the pixel locations selected to be checked, thereby reducing computational complexity. As seen in FIGS. 5A and 5B, in an exemplary embodiment, the pixel locations selected to be checked are the candidate pixel locations that are disposed between the best candidate integer pixel location 82 and the second best candidate half pixel location 98.

FIGS. 5C, 5D, 5E and 5F show selection of the reduced number of candidate pixel locations to be checked for selection of the MV 68 in which the second best candidate half pixel location 98 is diagonally displaced from the best candidate integer pixel location 82. In FIGS. 5C, 5D, 5E and 5F, pixel locations selected to be checked are enclosed within dotted line 96. As such, the pixel locations selected to be checked are the candidate pixel locations that are proximate to the best candidate integer pixel location 82 and disposed between the best candidate integer pixel location 82 and the second best candidate half pixel location 98.

FIGS. 5G and 5H show selection of the reduced number of candidate pixel locations to be checked for selection of the MV 68 in which the second best candidate half pixel location 98 is horizontally displaced from the best candidate integer pixel location 82. In FIGS. 5G and 5H, pixel locations selected to be checked are enclosed within dotted line 96. Computations for determining the block that most closely matches the original block may then only be calculated for the pixel locations selected to be checked, thereby reducing computational complexity as described above. As seen in FIGS. 5G and 5H, in an exemplary embodiment, the pixel locations selected to be checked are the candidate pixel locations that are disposed between the best candidate integer pixel location 82 and the second best candidate half pixel location 98.

In summary, for each of the scenarios presented in FIG. 5, the subset of candidate pixel locations that is selected to be checked includes only those pixel locations that are proximate to the best candidate integer pixel location 82 and disposed between the best candidate integer pixel location 82 and the second best candidate half pixel location 98.

Accordingly, as shown in FIGS. 4 and 5 above, the pixel locations selected to be checked form a subset of candidate pixel locations that is selected based upon a proximity of the subset of candidate pixel locations to particular candidate pixel locations of preceding sequential levels of accuracy. More specifically, as shown in FIG. 4 above, the subset of candidate pixel locations is selected based upon proximity to the best candidate pixel locations of preceding sequential levels of accuracy. Meanwhile, as shown in FIG. 5 above, the subset of candidate pixel locations is selected based on proximity to the second best candidate pixel location of a preceding level of accuracy and to the best candidate pixel location of a sequential level of accuracy prior to the preceding level of accuracy. Embodiments of the present invention have been shown to reduce the number of QPEL checks used for encoding standard video sequences by between about 21 to 55 percent, with an average reduction of about 37 percent.

Figure 6A:
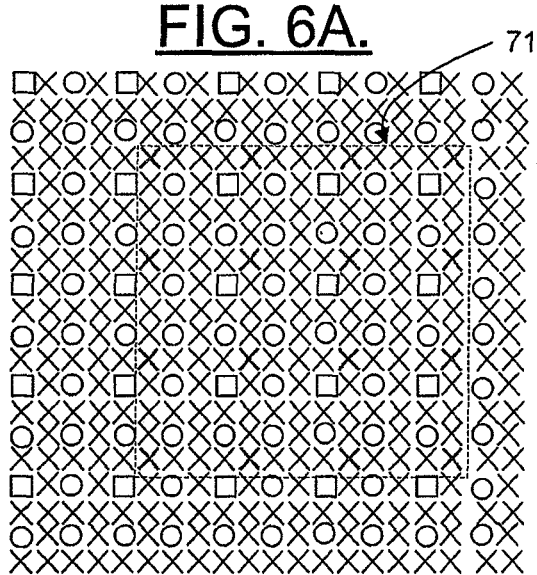
FIG. 6 illustrates a schematic diagram of an exemplary motion vector determination using a 4×4 block according to an exemplary embodiment of the present invention.
Figure 6B:
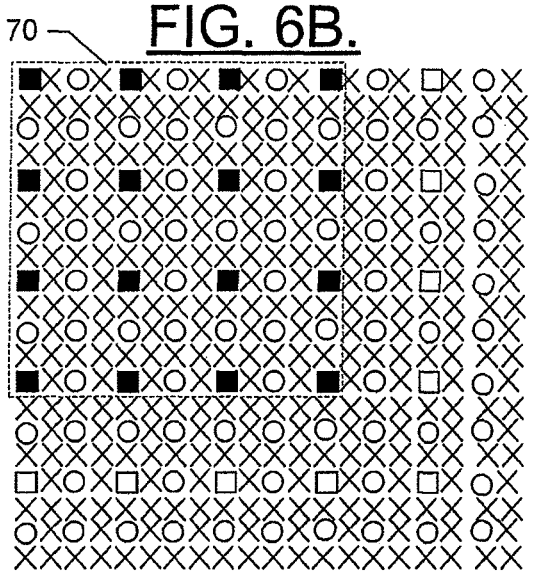

As stated above, FIGS. 3-5 illustrate a motion search for a block size of 1 pixel in order to show the direction of movement of a block in simpler terms. FIG. 6 illustrates a schematic diagram of an exemplary motion vector determination using a 4×4 block according to an exemplary embodiment of the present invention. As shown in FIG. 6B, an original block 70 in a particular frame may be defined as a 4×4 matrix of integer pixel locations. An embodiment of the present invention may then be employed to determine motion of the original block 70 to the position of a reference block 71 in a reference frame as shown in FIG. 6A. As such, using the operations described above, the reference block 71 may be considered the block that most closely matches the original block 70 at quarter pixel accuracy. Thus, a motion vector defines motion from a position of the original block 70 to a position of the reference block 71.

Figure 7:
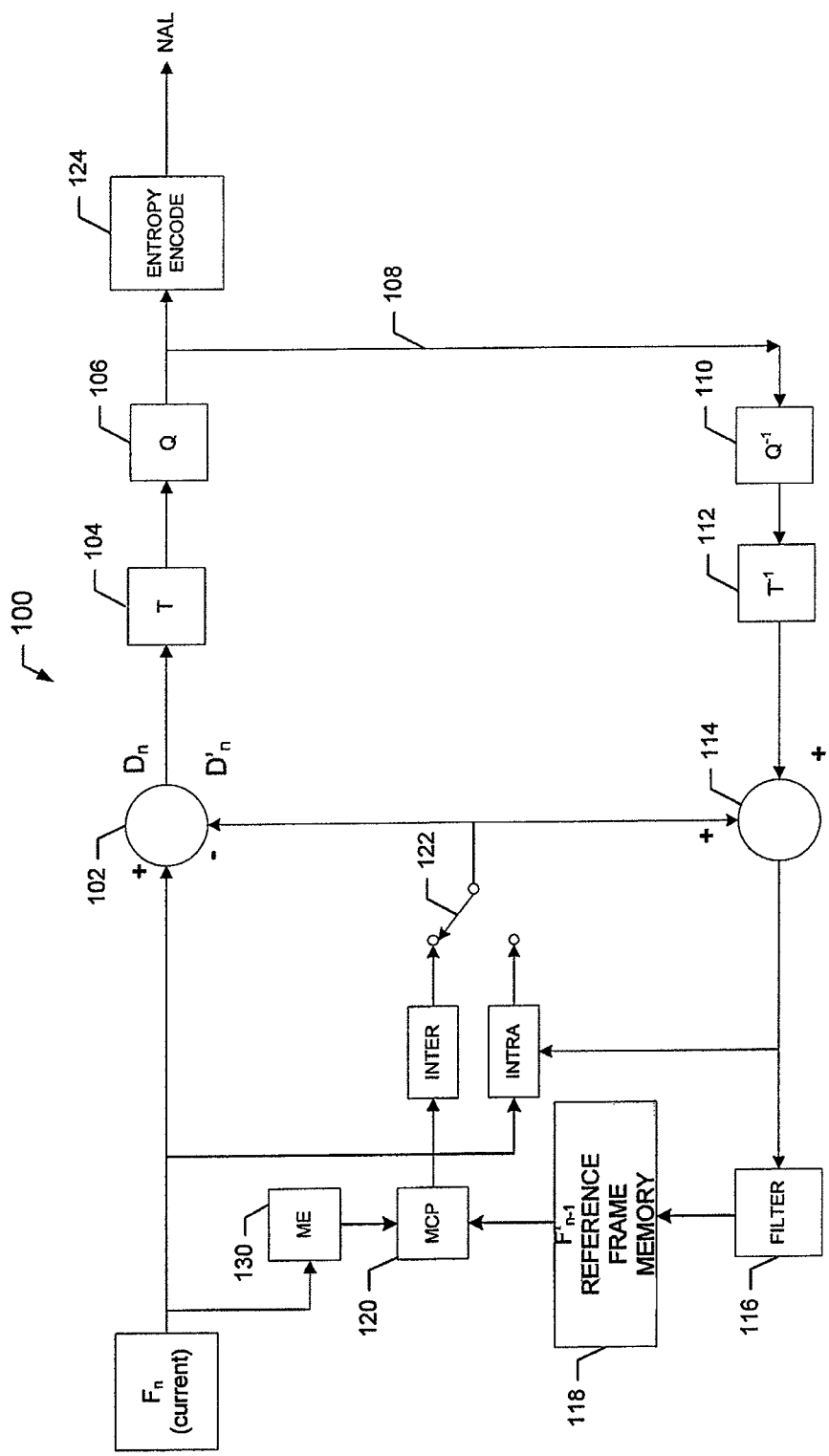
FIG. 7 is a schematic block diagram of an encoder according to exemplary embodiments of the invention.

FIG. 7 is a schematic block diagram of an encoder according to exemplary embodiments of the invention. FIG. 7 shows elements of an encoder 100 which may be employed, for example, in the mobile terminal 10 of FIG. 1. However, it should be noted that the encoder 100 of FIG. 7 may also be employed on a variety of other devices, both mobile and fixed, and therefore, embodiments of the present invention should not be limited to application on devices such as the mobile terminal 10 of FIG. 1. For example, the encoder 100 of FIG. 7 may be employed on a computing system, a video recorder, such as a DVD player, HD-DVD players, Digital Video Broadcast (DVB) handheld devices, personal digital assistants (PDAs), digital television set-top boxes, gaming and/or media consoles, etc. The encoder 100 may be any device or means embodied in either hardware, software, or a combination of hardware and software that is capable of encoding a video sequence having a plurality of video frames. In an exemplary embodiment, the encoder 100 may be embodied in software instructions stored in a memory of the mobile terminal 10 and executed by the controller 20. It should be noted that while FIG. 7 illustrates one example of a configuration of the encoder 100, numerous other configurations may also be used to implement embodiments of the present invention.

Referring now to FIG. 7, the encoder 100, as generally known to those skilled in the art that is capable of encoding an incoming video sequence is provided. As shown in FIG. 7, an input video frame $F_n$ (transmitted for example from a video source such as a camera module 36) may be received by the encoder 100. The input video frame $F_n$ is processed in units of a macroblock. The input video frame $F_n$ is supplied to the positive input of a difference block 102 and the output of the difference block 102 is provided to a transformation block 104 so that a set of transform coefficients based on the input video frame $F_n$ can be generated. The set of transform coefficients are then transmitted to a quantize block 106 which quantizes each input video frame to generate a quantized frame having a set of quantized transform coefficients. Loop 108 supplies the quantized frame to inverse quantize block 110 and inverse transformation block 112 which respectively perform inverse quantization of the quantized frames and inverse transformation of the transform coefficients. The resulting frame output from inverse transformation block 112 is sent to a summation block 114 which supplies the frame to filter 116 in order to reduce the effects of blocking distortion. The filtered frame may serve as a reference frame and may be stored in reference frame memory 118. As shown in FIG. 7, the reference frame may be a previously encoded frame $F'_{n-1}$. Motion Compensated Prediction (MCP) block 120 performs motion compensated prediction based on a reference frame stored in reference frame memory 118 to generate a prediction macroblock that is motion compensated based on a motion vector generated by motion estimation block 130. The motion estimation block 130 determines the motion vector from a best match macroblock in video frame $F_n$. The motion compensated block 120 shifts a corresponding macroblock in the reference frame based on this motion vector to generate the prediction macroblock.

The H.264/AVC video coding standard allows each macroblock to be encoded in either INTRA or INTER mode. In other words, the H.264/AVC video coding standard permits the encoder to choose whether to encode in the INTRA or INTER mode. In order to effectuate INTER mode coding, difference block 102 has a negative output coupled to MCP block 120 via selector 122. In this regard, the difference block 102 subtracts the prediction macroblock from the best match of a macroblock in the current video frame $F_n$ to produce a residual or difference macroblock $D_n$. The difference macroblock is transformed and quantized by transformation block 104 and quantize block 106 to provide a set of quantized transform coefficients. These coefficients may be entropy encoded by entropy encode block 124. The entropy encoded coefficients together with residual data required to decode the macroblock, (such as the macroblock prediction mode, quantizer step size, motion vector information specifying the manner in which the macrobock was motion compensated, etc.) form a compressed bitstream of an encoded macroblock. The encoded macroblock may be passed to a Network Abstraction Layer (NAL) for transmission and/or storage.

As will be appreciated by those skilled in the art, H.264/AVC supports two block types (sizes) for INTRA coding, namely, 4×4 and 16×16. However, encoders supporting other block sizes may also practice embodiments of the present invention.

An exemplary embodiment of the invention will now be described with reference to FIG. 8, in which certain elements of a motion estimation element for providing motion estimation for video encoding are displayed. The system of FIG. 8 may be employed, for example, on the mobile terminal 10 of FIG. 1. However, it should be noted that the system of FIG. 8 may also be employed on a variety of other devices, both mobile and fixed, and therefore, embodiments of the present invention should not be limited to application on devices such as the mobile terminal 10 of FIG. 1 although an exemplary embodiment of the invention will be described in greater detail below in the context of application in a mobile terminal. Such description below is given by way of example and not of limitation. For example, the system of FIG. 8 may be employed on a camera, a video recorder, etc. Furthermore, the system of FIG. 8 may be employed on a device, component, element or module of the mobile terminal 10. It should also be noted that while FIG. 8 illustrates one example of a configuration of the motion estimation element, numerous other configurations may also be used to implement embodiments of the present invention.

Figure 8:
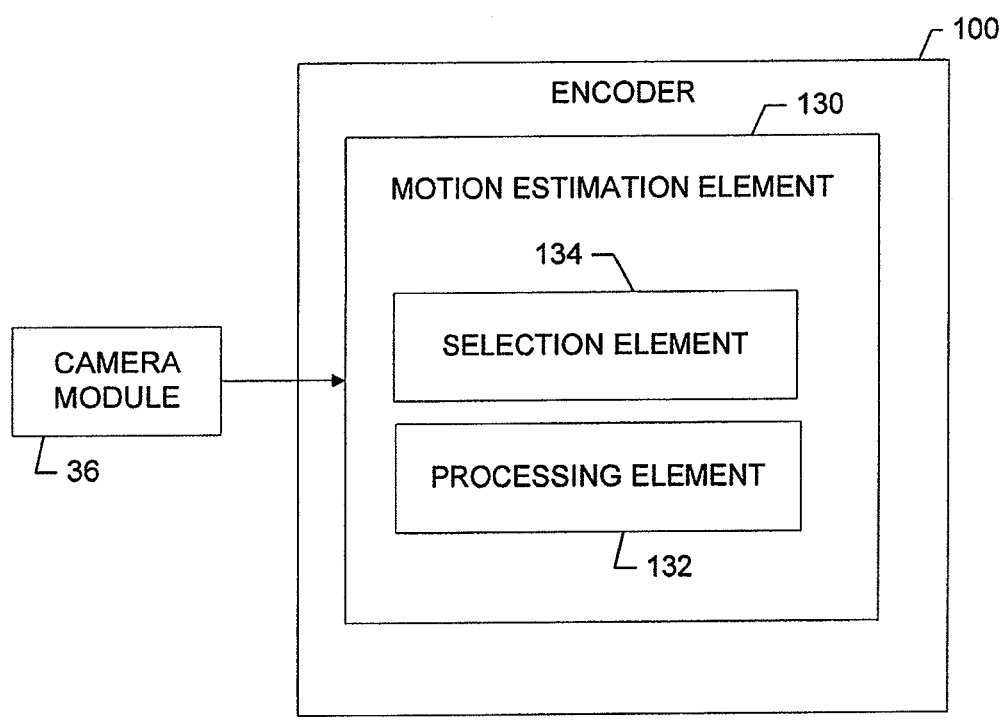
FIG. 8 is a schematic block diagram of a motion estimation stage of an encoder according to an exemplary embodiment of the present invention.

Referring now to FIG. 8, the motion estimation element 130 for providing motion estimation for video encoding may receive an input from any number of image data sources such as, for example, the camera module 36. The motion estimation element 130 according to embodiments of the present invention may alternatively be embodied as any device or means embodied in either hardware, software, or a combination of hardware and software that is capable of, among other things, calculating motion vectors as described in greater detail above. In this regard, the motion estimation element 130 may be disposed within an image processing chain such that, for example, images such as video images captured at the camera module 36 are automatically processed at the motion estimation element 130 as a part of the normal image processing chain. Alternatively, the motion estimation element 130 may be selectively employed either automatically based on device settings or upon user selection.

In an exemplary embodiment, the motion estimation element 130 may include a processing element 132 and a selection element 134. The processing element 132 may be capable of executing, for example, a search algorithm or any other mechanism for determining best candidate pixel locations at each corresponding accuracy level. In this regard, the processing element 132 may be capable of executing instructions for determining a similarity or difference between a candidate block and the original block 70 as described above for every candidate block of interest. As such candidate blocks of interest may be determined by the level of accuracy desired. For example, if QPEL accuracy is desired, calculations may be performed for all candidate blocks at the integer and half pixel levels in order to determine the best candidate integer and half pixel locations as described above while calculations are performed for only candidate blocks corresponding to the subset of candidate pixel locations at the quarter pixel level. The processing element 132 may be embodied in many ways. For example, the processing element 132 may be embodied as a processor, a coprocessor, a controller or various other processing means or devices including integrated circuits such as, for example, an ASIC (application specific integrated circuit). In an exemplary embodiment, the processing element 132 could, for example, be the controller 20 of FIG. 1.

The selection element 134 may be embodied as any device or means embodied in either hardware, software, or a combination of hardware and software that is capable of determining the subset of candidate pixel locations to be checked as described above. The selection element 134 may be in communication with the processing element 132 in order to communicate the subset of candidate pixel locations to the processing element 132, thereby enabling the processing element 132 to selectively determine the MV 68 to the respective desired accuracy level with a reduced number of calculations.

Figure 9:
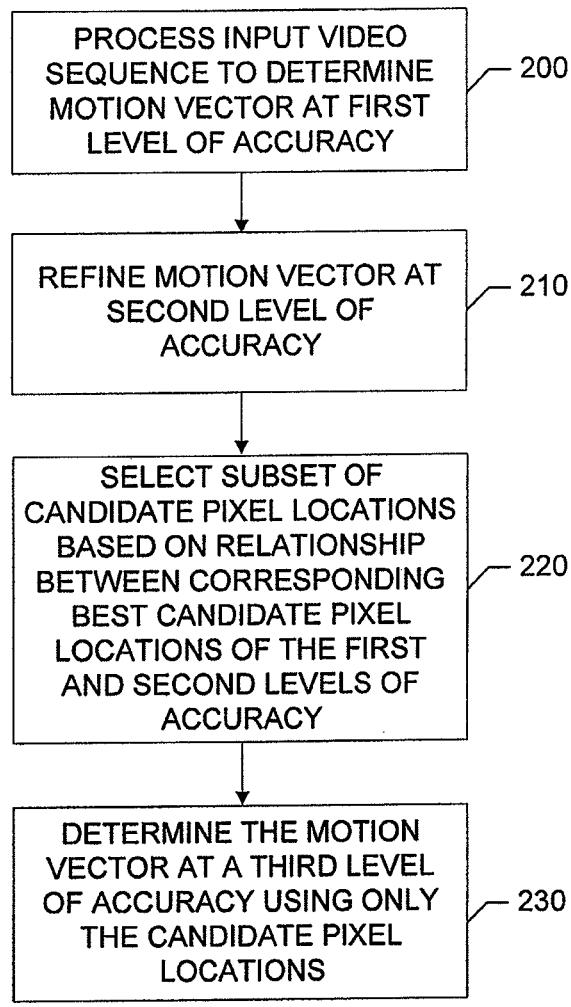
FIG. 9 is a flowchart according to an exemplary method of providing motion estimation for video encoding according to one embodiment of the present invention.

FIG. 9 is a flowchart of a system, methods and program products according to exemplary embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method of providing motion estimation for video encoding, as shown in FIG. 9, may include processing an input video sequence to determine a motion vector at a first level of accuracy at operation 200. In an exemplary embodiment, operation 200 may include determining the best candidate pixel location of the first level of accuracy corresponding to a candidate block in a reference frame that most closely matches an original block at the first level of accuracy, which may be an integer pixel level of accuracy. At operation 210, the motion vector may be refined to a second and higher level of accuracy such as half pixel (or half pel) accuracy. In an exemplary embodiment, operation 210 may include determining the best candidate pixel location of the second level of accuracy corresponding to a candidate block in a reference frame that most closely matches the original block at the second level of accuracy. A subset of candidate pixel locations may be selected based on a relationship between corresponding best candidate pixel locations of the first and second levels of accuracy at operation 220. Selecting the subset of candidate pixel locations may include selecting only candidate pixel locations that are proximate to the best candidate pixel location of the second level of accuracy and between the best candidate pixel location of the second level of accuracy and the best candidate pixel location of the first level of accuracy if the best candidate pixel location of the second level of accuracy is different than the best candidate pixel location of the first level of accuracy. Alternatively, selecting the subset of candidate pixel locations may include selecting only candidate pixel locations that are proximate to the best candidate pixel location of the first level of accuracy and between the best candidate pixel location of the first level of accuracy and a second best candidate pixel location of the second level of accuracy if the best candidate pixel location of the second level of accuracy is the same as the best candidate pixel location of the first level of accuracy and if the second best candidate pixel location is known. In an exemplary embodiment, less than half of a total number of candidate pixel locations may be selected as the subset of candidate pixel locations in order to reduce the number of calculations required to determine the motion vector by having a decreased number of candidate pixel locations for which calculations are performed. At operation 230, the motion vector is determined at a third level of accuracy using only the subset of candidate pixel locations. In an exemplary embodiment, operation 230 may include determining the best candidate pixel location of the third level of accuracy corresponding to a candidate block in a reference frame that most closely matches an original block at the third level of accuracy.

The above described functions may be carried out in many ways. For example, any suitable means for carrying out each of the functions described above may be employed to carry out embodiments of the invention. In one embodiment, all or a portion of the elements of the invention generally operate under control of a computer program product. The computer program product for performing the methods of embodiments of the invention includes a computer-readable storage medium, such as a non-transitory non-volatile storage medium, and computer-readable program code portions, such as a series of computer instructions, embodied in the computer-readable storage medium.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   processing an input video sequence to determine a motion vector at a first level of accuracy;
   refining the motion vector at a second level of accuracy;
   selecting, with a selection element, a subset including less than all of candidate pixel locations at least partially based on whether a best candidate pixel location of the second level of accuracy is the same as a best candidate pixel location of the first level of accuracy; and
   determining the motion vector at a third level of accuracy based on the subset of candidate pixel locations,
   wherein when the best candidate pixel location of the second level of accuracy is the same as the best candidate pixel location of the first level of accuracy and a second best candidate pixel location of the second level of accuracy is known, selecting the subset of candidate pixel locations comprises selecting candidate pixel locations proximate to the best candidate pixel location of the first level of accuracy that are between the best candidate pixel location of the first level of accuracy and the second best candidate pixel location of the second level of accuracy.

2. The method according to claim 1, wherein when the best candidate pixel location of the second level of accuracy is not the same as the best candidate pixel location of the first level of accuracy, selecting the subset of candidate pixel locations comprises selecting candidate pixel locations proximate to the best candidate pixel location of the second level of accuracy that are between the best candidate pixel location of the second level of accuracy and the best candidate pixel location of the first level of accuracy.

3. The method according to claim 1, wherein processing the input video sequence to determine the motion vector at the first level of accuracy comprises determining the best candidate pixel location of the first level of accuracy corresponding to a candidate block in a reference frame that most closely matches an original block at the first level of accuracy.

4. The method according to claim 1, wherein refining the motion vector at the second level of accuracy comprises determining the best candidate pixel location of the second level of accuracy corresponding to a candidate block in a reference frame that most closely matches an original block at the second level of accuracy.

5. The method according to claim 1, wherein determining the motion vector at the third level of accuracy comprises determining the best candidate pixel location of the third level of accuracy corresponding to a candidate block in a reference frame that most closely matches an original block at the third level of accuracy.

6. The method according to claim 1, wherein selecting the subset of candidate pixel locations comprises selecting less than half of a total number of candidate pixel locations.

7. A computer program product comprising at least one non-transitory computer-readable storage medium having computer-readable program code portions stored therein, the computer-readable program code portions comprising:
   a first executable portion for processing an input video sequence to determine a motion vector at a first level of accuracy;
   a second executable portion for refining the motion vector at a second level of accuracy;
   a third executable portion for selecting a subset including less than all of candidate pixel locations at least partially based on whether a best candidate pixel location of the second level of accuracy is the same as a best candidate pixel location of the first level of accuracy; and
   a fourth executable portion for determining the motion vector at a third level of accuracy based on the subset of candidate pixel locations,
   wherein when the best candidate pixel location of the second level of accuracy is the same as the best candidate pixel location of the first level of accuracy and a second best candidate pixel location of the second level of accuracy is known, selecting the subset of candidate pixel locations comprises selecting candidate pixel locations proximate to the best candidate pixel location of the first level of accuracy that are between the best candidate pixel location of the first level of accuracy and the second best candidate pixel location of the second level of accuracy.

8. The computer program product according to claim 7, wherein when the best candidate pixel location of the second level of accuracy is not the same as the best candidate pixel location of the first level of accuracy, the third executable portion includes instructions for selecting candidate pixel locations proximate to the best candidate pixel location of the second level of accuracy that are between the best candidate pixel location of the second level of accuracy and the best candidate pixel location of the first level of accuracy.

9. The computer program product according to claim 7, wherein the first executable portion includes instructions for determining the best candidate pixel location of the first level of accuracy corresponding to a candidate block in a reference frame that most closely matches an original block at the second level of accuracy.

10. The computer Program product according to claim 7, wherein the second executable portion includes instructions for determining the best candidate pixel location of the second level of accuracy corresponding to a candidate block in a reference frame that most closely matches an original block at the second level of accuracy.

11. The computer program product according to claim 7, wherein the fourth executable portion includes instructions for determining the best candidate pixel location of the second level of accuracy corresponding to a candidate block in a reference frame that most closely matches an original block at the second level of accuracy.

12. The computer program product according to claim 7, wherein the third executable portion includes instructions for selecting less than half of a total number of candidate pixel locations.

13. An apparatus comprising:
a selection element configured to select a subset including less than all of candidate pixel locations from among a plurality of candidate pixel locations used for motion vector determination at least partially based on whether a best candidate pixel location of a first level of accuracy is the same as a best candidate pixel location of a second level of accuracy; and
a processing element configured to:
process an input video sequence to determine a motion vector at the first level of accuracy,
refine the motion vector at the second level of accuracy, and
determine the motion vector at a third level of accuracy based on the subset of candidate pixel locations,
wherein when the best candidate pixel location of the second level of accuracy is the same as the best candidate pixel location of the first level of accuracy and a second best candidate pixel location of the second level of accuracy is known, selecting the subset of candidate pixel locations comprises selecting candidate pixel locations proximate to the best candidate pixel location of the first level of accuracy that are between the best candidate pixel location of the first level of accuracy and the second best candidate pixel location of the second level of accuracy.

14. The apparatus according to claim 13, wherein when the best candidate pixel location of the second level of accuracy is not the same as the best candidate pixel location of the first level of accuracy, the selection element is configured to select the subset of candidate pixel locations by selecting candidate pixel locations proximate to the best candidate pixel location of the second level of accuracy that are between the best candidate pixel location of the second level of accuracy and the best candidate pixel location of the first level of accuracy.

15. The apparatus according to claim 13, wherein the processing element is configured to determine the best candidate pixel location of the first level of accuracy corresponding to a candidate block in a reference frame that most closely matches an original block at the first level of accuracy.

16. The apparatus according to claim 15, wherein the processing element is configured to determine the best candidate pixel location of the second level of accuracy corresponding to a candidate block in a reference frame that most closely matches an original block at the second level of accuracy.

17. The apparatus according to claim 16, wherein the processing element is configured to determine the best candidate pixel location of the third level of accuracy corresponding to a candidate block in a reference frame that most closely matches an original block in a reference frame at the third level of accuracy.

18. The apparatus according to claim 17, wherein the first level of accuracy corresponds to an integer pixel level, the second level of accuracy corresponds to a half pixel level and the third level of accuracy corresponds to a quarter pixel level.

19. The apparatus according to claim 13, wherein the selection element is configured to select less than half of a total number of candidate pixel locations.

20. The apparatus according to claim 13, wherein the apparatus is embodied in a mobile terminal.

21. An encoder that utilizes motion estimation, the encoder comprising:
a motion estimator configured to process an input video sequence to determine a motion vector at a first level of accuracy, refine the motion vector at a second level of accuracy, select a subset including less than all of candidate pixel locations at least partially based on whether a best candidate pixel location of the second level of accuracy is the same as a best candidate pixel location of the first level of accuracy, and determine the motion vector at a third level of accuracy using only the subset of candidate pixel locations; and
a motion compensated prediction block configured to apply the motion vector determined at the third level of accuracy to a reference frame in order to generate a prediction macroblock that is motion compensated,
wherein when the best candidate pixel location of the second level of accuracy is the same as the best candidate pixel location of the first level of accuracy and a second best candidate pixel location of the second level of accuracy is known, selecting the subset of candidate pixel locations comprises selecting candidate pixel locations proximate to the best candidate pixel location of the first level of accuracy that are between the best candidate pixel location of the first level of accuracy and the second best candidate pixel location of the second level of accuracy.

22. The method according to claim 1, wherein the method is carried out within an image processing chain and responsive to one of predetermined settings and user selection.

* * * * *